United States Patent
Amirkhany et al.

(10) Patent No.: US 11,114,057 B2
(45) Date of Patent: Sep. 7, 2021

(54) SMART GATE DISPLAY LOGIC

(71) Applicant: Samsung Display Co., Ltd., Yongin-si (KR)

(72) Inventors: Amir Amirkhany, Sunnyvale, CA (US); Charlene Ku, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 23 days.

(21) Appl. No.: 16/183,488

(22) Filed: Nov. 7, 2018

(65) Prior Publication Data

US 2020/0074957 A1    Mar. 5, 2020

Related U.S. Application Data

(60) Provisional application No. 62/723,906, filed on Aug. 28, 2018.

(51) Int. Cl.
| | |
|---|---|
| *G09G 5/00* | (2006.01) |
| *G06F 1/10* | (2006.01) |
| *G06F 1/3237* | (2019.01) |
| *G06F 1/3234* | (2019.01) |

(52) U.S. Cl.
CPC .............. *G09G 5/006* (2013.01); *G06F 1/10* (2013.01); *G06F 1/3237* (2013.01); *G06F 1/3265* (2013.01); *G09G 2310/0297* (2013.01); *G09G 2330/021* (2013.01)

(58) Field of Classification Search
CPC ............. G09G 5/006; G09G 2330/021; G09G 2310/0297; G09G 2370/08; G09G 2330/023; G09G 2360/02; G09G 2360/18; G09G 5/18; G09G 3/20; G06F 1/10; G06F 1/3237; G06F 1/3265
See application file for complete search history.

(56) References Cited

U.S. PATENT DOCUMENTS

| | | | | |
|---|---|---|---|---|
| 6,037,919 | A * | 3/2000 | Hanson | G09G 3/3611 345/100 |
| 6,075,510 | A * | 6/2000 | Blouin | G09G 3/3611 345/213 |
| 6,337,929 | B1 * | 1/2002 | Kajiwara | G06T 9/004 382/239 |
| 6,457,135 | B1 | 9/2002 | Cooper | |
| 6,680,732 | B2 * | 1/2004 | Yoo | G09G 3/2007 345/173 |

(Continued)

OTHER PUBLICATIONS

EPO Extended Search Report dated Jan. 21, 2020, for corresponding European Patent Application No. 19190839.1 (8 pages).

*Primary Examiner* — Grant Sitta
(74) *Attorney, Agent, or Firm* — Lewis Roca Rothgerber Christie LLP

(57) ABSTRACT

Provided is a method of reducing power consumption by a display device including a display logic for processing pixel data, and a display panel including a plurality of pixels, the method including receiving the pixel data corresponding to the plurality of pixels, determining whether a number of consecutive pixels of the plurality of pixels that correspond to identical data of the pixel data reaches a threshold number, and powering down the display logic when the number of consecutive pixels exceeds the threshold number.

28 Claims, 4 Drawing Sheets

High Entropy Image
(Rare)

Low Entropy Image
(Common)

(56) References Cited

U.S. PATENT DOCUMENTS

| | | | |
|---|---|---|---|
| 7,298,375 B1* | 11/2007 | Hutchins | G06T 1/0007 345/506 |
| 7,629,952 B2 | 12/2009 | Burr et al. | |
| 8,289,307 B2* | 10/2012 | Chiang | G09G 3/3685 345/211 |
| 8,804,819 B1* | 8/2014 | Jia | H04N 19/30 375/240.02 |
| 8,862,906 B2 | 10/2014 | Jeganathan et al. | |
| 8,933,724 B2 | 1/2015 | Cressman | |
| 9,563,931 B2 | 2/2017 | Murakami et al. | |
| 9,978,343 B2* | 5/2018 | Simha | G06T 1/20 |
| 10,074,203 B2* | 9/2018 | Morein | G09G 5/003 |
| 10,229,627 B2* | 3/2019 | Bian | G09G 3/2092 |
| 10,366,669 B2* | 7/2019 | Bae | G09G 3/2092 |
| 10,509,576 B2* | 12/2019 | Sodhi | G06F 3/0673 |
| 2001/0005193 A1* | 6/2001 | Yokoyama | G09G 3/3648 345/92 |
| 2001/0026588 A1* | 10/2001 | Kim | H04N 19/423 375/240.12 |
| 2003/0030618 A1* | 2/2003 | Jones | G09G 3/3611 345/102 |
| 2004/0024983 A1* | 2/2004 | Satoh | G09G 5/006 711/171 |
| 2005/0237294 A1* | 10/2005 | Miyachi | G09G 3/3688 345/102 |
| 2006/0008158 A1* | 1/2006 | Sawabe | G09G 5/393 382/232 |
| 2006/0101293 A1* | 5/2006 | Chandley | G06F 1/3203 713/300 |
| 2006/0267972 A1* | 11/2006 | Yi | G09G 3/3648 345/211 |
| 2007/0001999 A1* | 1/2007 | Smith | G09G 3/3406 345/102 |
| 2007/0002036 A1 | 1/2007 | Kardach et al. | |
| 2008/0001934 A1* | 1/2008 | Wyatt | G09G 3/3648 345/204 |
| 2008/0136752 A1* | 6/2008 | Inoue | G09G 3/2022 345/77 |
| 2008/0266331 A1* | 10/2008 | Chen | G09G 3/3406 345/690 |
| 2009/0316987 A1* | 12/2009 | Ouyang | G06K 9/38 382/172 |
| 2011/0012918 A1* | 1/2011 | Lee | G09G 3/2055 345/596 |
| 2011/0025656 A1* | 2/2011 | Huang | G09G 3/3688 345/204 |
| 2012/0146968 A1 | 6/2012 | Glen | |
| 2012/0188224 A1* | 7/2012 | Lee | G09G 3/20 345/214 |
| 2012/0249563 A1* | 10/2012 | Wyatt | G06F 3/14 345/522 |
| 2014/0160136 A1* | 6/2014 | Kaburlasos | G09G 5/00 345/520 |
| 2016/0080729 A1* | 3/2016 | Watanabe | G02B 30/27 348/54 |
| 2016/0098967 A1* | 4/2016 | Kwon | G09G 3/3688 345/211 |
| 2017/0132021 A1 | 5/2017 | Monfort et al. | |
| 2017/0256194 A1* | 9/2017 | Kim | G09G 3/3614 |
| 2018/0018927 A1 | 1/2018 | Amirkhany | |
| 2018/0075811 A1* | 3/2018 | Wacyk | G09G 3/3233 |
| 2018/0164846 A1 | 6/2018 | Zerwick | |
| 2018/0253050 A1* | 9/2018 | Otani | H04N 1/40 |
| 2019/0050963 A1* | 2/2019 | Wang | G09G 5/001 |

\* cited by examiner

SMART GATE DISPLAY LOGIC

CROSS-REFERENCE TO RELATED APPLICATION(S)

This patent application claims priority to, and the benefit of, U.S. provisional patent application No. 62/723,906, entitled SMART GATE DISPLAY LOGIC, filed on Aug. 28, 2018.

FIELD

One or more aspects of embodiments of the present disclosure relate generally to display systems and display devices, more particularly, to a system for reducing power consumption in a display device, and a display device including the same.

BACKGROUND

A display logic for processing pixel data (e.g., a logic block, pipeline, state machine, etc.) in conventional displays generally consumes the same amount of power regardless of the visual content corresponding to the pixel data being processed. This may be true regardless of the level of entropy of the images being displayed.

Figure 1:
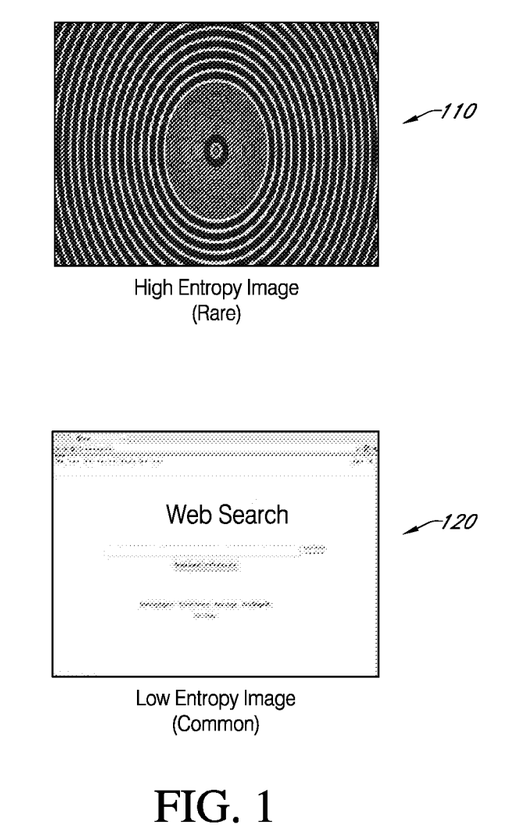
FIG. 1 depicts examples of a high entropy image and a low entropy image.
Figure 2:
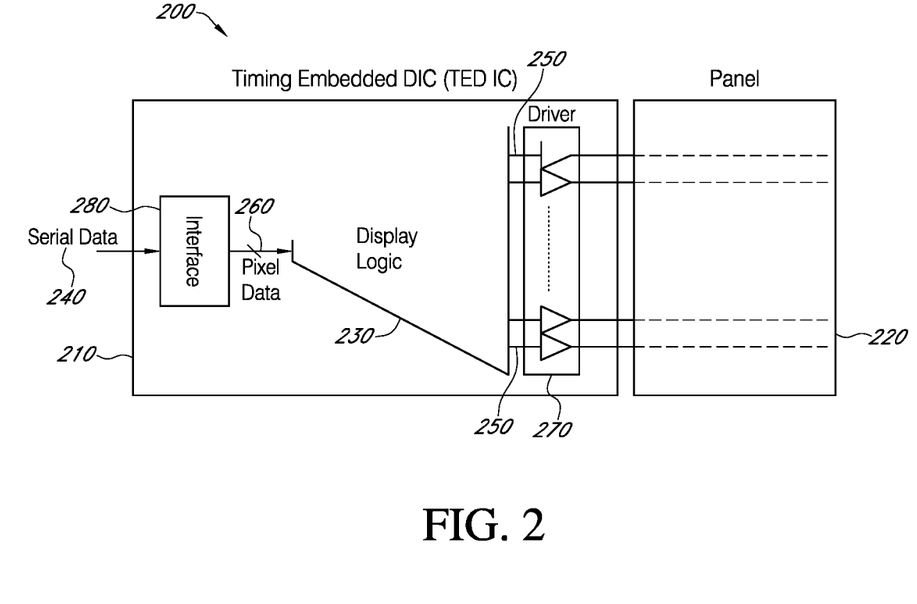
FIG. 2 is a block diagram of a display device including a timing embedded driver integrated circuit and a display panel.

FIG. 1 depicts examples of a high entropy image 110 and a low entropy image 120. FIG. 2 is a block diagram of a display device 200 including a timing embedded driver integrated circuit (DIC) 210 and a display panel 220.

Referring to FIGS. 1 and 2, the timing embedded DIC (TED IC) 210 of a conventional display device 200 may include a display logic 230. The TED IC 210 may also include an interface 280 for converting serial data 240 received by the display device 200 into pixel data 260 to be processed by the display logic 230. The TED IC 210 may also include a driver 270 for receiving processed pixel data 250 from the display logic 230. The driver 270 may deliver the processed pixel data 250 to a display panel 220 for driving the display panel 220.

Accordingly, the TED IC 210 may receive input serial data 240 at the interface 280, which may convert the serial data 240 to the pixel data 260. The interface 280 may then deliver the pixel data 260 to the display logic 230. The display logic 230 may process the pixel data 260 to produce processed pixel data 250, and may control the driver 270 based on the processed pixel data 250. The driver 270 may then deliver signals (e.g., data signals) to the display panel 220 according to the control of the display logic 230.

As mentioned above, in a conventional display device, during operation, the display logic may consume the same amount of power regardless of the type of image being shown (e.g., regardless of whether the high entropy image 110 or the low entropy image 120 of the example of FIG. 1 is displayed by the display panel). Accordingly, it may be suitable to develop a system capable of regulating energy consumption by the display logic according to a level of entropy of an image displayed based on analysis of received pixel data, noting that a lower entropy image may refer to an image in which a relatively large amount of pixels (e.g., consecutive pixels) of the display panel output a same image (e.g., during an image frame).

It should be noted that information disclosed in this Background section is only for enhancement of understanding of the embodiments of the present disclosure and may include technical information acquired in the process of achieving the inventive concept. Therefore, it may contain information that does not form prior art.

SUMMARY

Embodiments described herein provide improvements to the field of display devices by providing a display logic bypass system capable of reducing an amount of power consumed by a display logic according to a level of entropy of an image displayed by a display device including the system.

According to one embodiment of the present disclosure, there is provided a method of reducing power consumption by a display device including a display logic for processing pixel data, and a display panel including a plurality of pixels, the method including receiving the pixel data corresponding to the plurality of pixels, determining whether a number of consecutive pixels of the plurality of pixels that correspond to identical data of the pixel data reaches a threshold number, and powering down the display logic when the number of consecutive pixels exceeds the threshold number.

The threshold number may correspond to a pipeline depth of the display logic.

The powering down the display logic may include clock-gating the display logic to prevent a clock signal from being output to the display logic.

The method may further include, after powering down the display logic, outputting a reset signal from a comparator to a counter to reset a tally held by the counter, and passing through a clock signal to the display logic upon resetting the tally to power on the display logic.

The powering down may include outputting a counter output indicating that the number of consecutive pixels exceeds the threshold number from a counter configured to tally the consecutive pixels.

The method may further include outputting a comparator output from a comparator according to a comparison of a current pixel input value corresponding to the pixel data with an immediately previous pixel input value corresponding to the pixel data, and incrementing or resetting a tally held by a counter configured to tally the consecutive pixels according to the comparator output.

The method may further include holding a previous pixel output value output from the display logic, and outputting the previous pixel output value as a current pixel output value when the display logic is powered down.

According to another embodiment of the present disclosure, there is provided a display device capable of reduced power consumption, the display device including a display panel including a plurality of pixels, a display logic for receiving pixel data corresponding to the plurality of pixels, and a display logic bypass system including a comparator and a counter for determining whether a number of consecutive pixels corresponding to identical data of the pixel data reaches a threshold number, wherein the display logic bypass system is configured to power down the display logic when the number of consecutive pixels exceeds the threshold number.

The threshold number may correspond to a pipeline depth of the display logic.

The display device may further include a clock-gating cell for powering down the display logic by clock-gating the display logic to prevent a clock signal from being output to the display logic.

The comparator may be configured to output a reset signal to the counter to reset a tally held by the counter, and the counter may be configured to output a counter output to the clock-gating cell upon resetting the tally to cause the clock-gating cell to pass through a clock signal to the display logic to power on the display logic.

The counter may be configured to output a counter output indicating that the number of consecutive pixels exceeds the threshold number from a counter configured to tally the consecutive pixels to power down the display logic.

The comparator may be configured to output a comparator output according to a comparison of a current pixel input value corresponding to the pixel data with an immediately previous pixel input value corresponding to the pixel data, and the counter may be configured to increment or reset a tally held by the counter for tallying the consecutive pixels according to the comparator output.

The display device may further include a multiplexer connected to the display logic, and a previously output pixel value register connected to the multiplexer for holding a previous pixel output value output from the display logic, wherein the multiplexer is configured to output the previous pixel output value as a current pixel output value when the display logic is powered down.

According to yet another embodiment of the present disclosure, there is provided a non-transitory computer readable medium implemented on a display device including a display logic for processing pixel data, and a display panel including a plurality of pixels, the non-transitory computer readable medium having computer code that, when executed on a processor, implements a method of reducing power consumption, the method including receiving the pixel data corresponding to the plurality of pixels, determining whether a number of consecutive pixels of the plurality of pixels that correspond to identical data of the pixel data reaches a threshold number, and powering down the display logic when the number of consecutive pixels exceeds the threshold number.

The powering down the display logic may include clock-gating the display logic to prevent a clock signal from being output to the display logic.

The method of reducing power consumption may further include, after powering down the display logic, outputting a reset signal from a comparator to a counter to reset a tally held by the counter, and passing through a clock signal to the display logic upon resetting the tally to power on the display logic.

The powering down may include outputting a counter output indicating that the number of consecutive pixels exceeds the threshold number from a counter configured to tally the consecutive pixels.

The method may further include outputting a comparator output from a comparator according to a comparison of a current pixel input value corresponding to the pixel data with an immediately previous pixel input value corresponding to the pixel data, and incrementing or resetting a tally held by a counter configured to tally the consecutive pixels according to the comparator output.

The method may further include holding a previous pixel output value output from the display logic, and outputting the previous pixel output value as a current pixel output value when the display logic is powered down.

Accordingly, the display logic bypass system is able to reduce an amount of power consumed by the display logic by determining whether a threshold number of consecutive pixels correspond to identical pixel data, thereby indicating a low entropy image, and clock-gating the display logic to power down the display logic when the threshold number is exceeded while continuing to output the most recently output pixel data output by the display logic.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

As mentioned above, a display logic of a conventional display device may consume the same amount of power regardless of the content being processed. However, if an image has a relatively high amount of redundancy (i.e., if the image is a low entropy image), it may be suitable to provide a method for reducing an amount of power consumed by the display logic. Accordingly, embodiments of the present disclosure provide a display logic bypass system capable of lowering data processing power for simpler (lower entropy) images by providing an elegant method for reducing power consumed by the display logic by clock-gating the display logic. That is, when an image displayed by a display panel has a relatively large degree of redundancy, embodiments of the present disclosure are able to proportionately take the power of the logic pipeline of the display logic.

For example, a level of entropy of an image may be determined by examining the pixel data corresponding to the pixels that display the image, the pixel data being input to the pipeline of the display processing. If the pixel data corresponding to consecutive pixels is repetitive (e.g., if the data of consecutive pixels repeats several times due to the consecutive pixels displaying a same color and a same light intensity, such that a memory of the pipeline is completely flushed, meaning that the memory inside the pipeline does not depend on any other pixel), then it can be determined that subsequent pixel data may also be the same.

Accordingly, when displaying a low entropy image, essentially nothing happens for that pipeline or for that state machine because all of the states are determined by a sequence of identical impulses. Once it is determined that the sequence of identical impulses is of a threshold length, the display logic can be powered down, and the previously output pixel value can be simply held and repeated. Embodiments of the present disclosure, therefore, provide a clock-gating method based on serial data input to the display logic to significantly reduce power when serial data input is static.

As described below, examples of processing for the display may include, for example, high dynamic range (HDR) processing, Pentile conversion, or other types of image processing.

Figure 3:
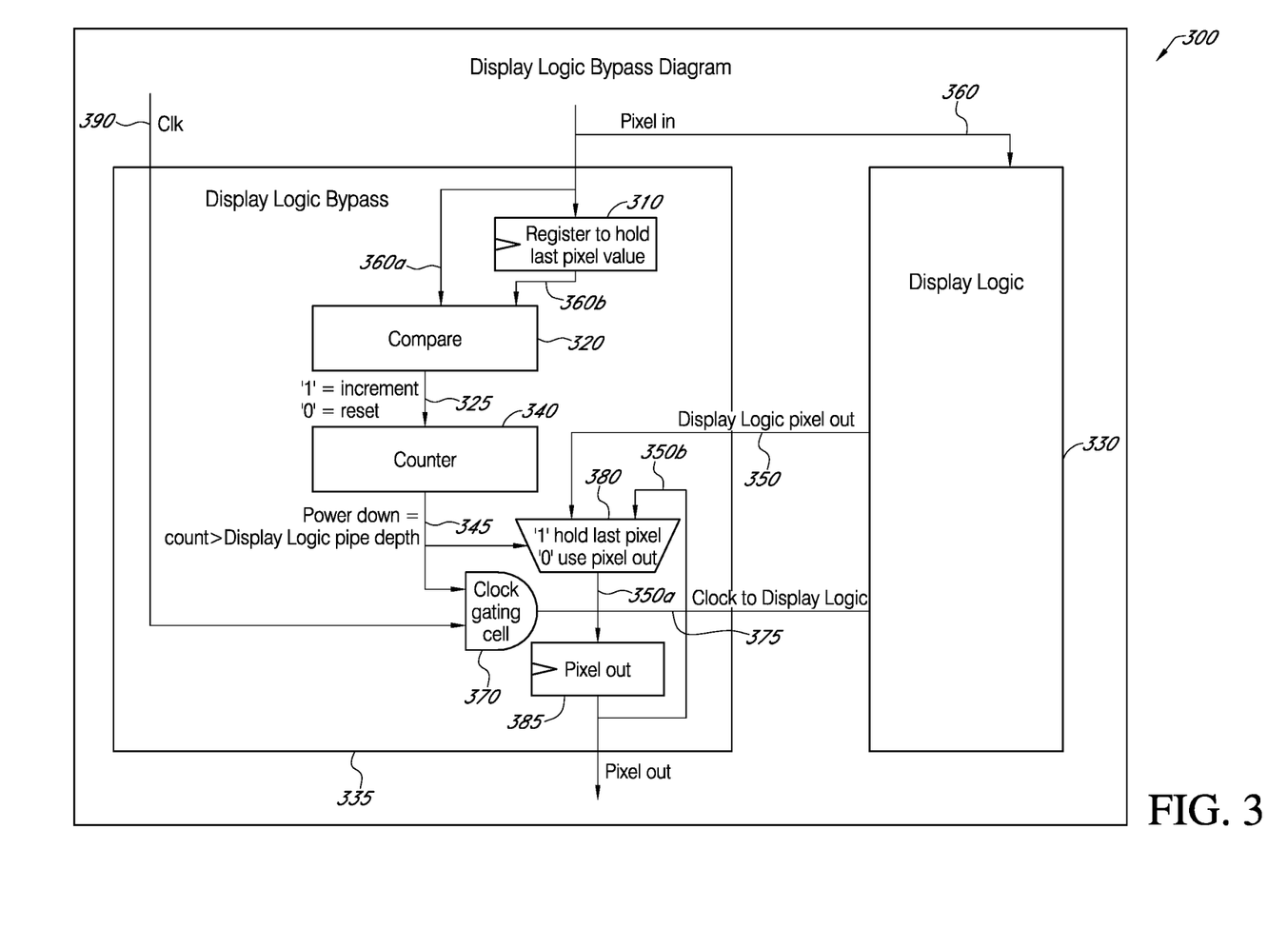
FIG. 3 illustrates a block diagram of a display logic and a display logic bypass system, according to an embodiment of the present disclosure.

FIG. 3 illustrates a block diagram 300 of a display logic 330 and a display logic bypass system 335, according to an embodiment of the present disclosure.

Referring to FIG. 3, like the display device 200 of FIG. 2, the system of the present embodiment includes a display logic 330, which may be implemented on a TED IC.

However, the system of the present embodiment further includes a display logic bypass system 335 for reducing power consumed by the display logic 330.

In the present embodiment, the display logic 330 and the display logic bypass system 335 both receive pixel data ("pixel in") 360. For example, the pixel data 360 may correspond to the pixel data 260 transmitted from the interface 280 to the display logic 230 in FIG. 2. The pixel data may be externally supplied.

The display logic (logic block, pipeline, state machine) 330 may have a pipeline depth (memory) of N (e.g., N pixel values, N being an integer). Further, the display logic pixel value output 350 of the display logic 330 may be strictly a function of input pixel data 360. That is, identical pixel input values of the pixel data 360 may consistently result in the generation of the same display logic pixel value output 350.

The display logic bypass system 335 includes a previous pixel value input register (e.g., a register for holding an immediately previously input pixel value) 310 to hold a previous pixel input value (e.g., the last, or most recently input, pixel value) 360b.

The display logic bypass system 335 also includes a comparator 320 connected to the previous pixel value input register 310. The comparator 320 may be configured to receive the input pixel data 360, and to receive the previous pixel input value 360b that is output from the previous pixel value input register 310. The comparator 320 may be configured to compare a current pixel input value (e.g., a current pixel value that is input subsequently to the last pixel value that was input) 360a of the pixel data 360 to the previous pixel input value 360b held by the previous pixel value input register 310 and output by the previous pixel value input register 310 to the comparator 320.

The comparator 320 may be configured to determine whether the current pixel input value 360a of the pixel data 360 and the previous pixel input value 360b of the pixel data 360 are the same. When the current pixel input value 360a and the previous pixel input value 360b are the same, the comparator 320 may output the comparator output 325 having a corresponding value (e.g., a "1" value or a high logic signal). Conversely, when the current pixel input value 360a and the previous pixel input value 360b are different, the comparator 320 may output a different value as the comparator output 325 (e.g., a "0" value or a low logic signal).

The display logic bypass system 335 also includes a counter 340. The counter 340 may be connected to the comparator 320, and may be configured to receive the comparator output 325 that is output from the comparator 320.

When the counter 340 receives a "1" from the comparator 320, a tally, or count, that is maintained by the counter 340 may be increased, or incremented, by one. Accordingly, the counter 340 may keep a running tally of identical consecutive input pixel values of the pixel data 360. Conversely, when the counter 340 receives a "0" from the comparator 320, the count maintained by the counter 340 may be reset to zero. Accordingly, the counter 340 may reset when consecutive input pixel values (e.g., the current pixel input value 360a and the previous pixel input value 360b) are not identical.

The counter 340 may be configured to output a counter output 345. The counter output 345 from the counter 340 may correspond to a tally of consecutive identical pixel inputs 360. For example, the counter 340 may output a "1" or a high logic value when a count of consecutive identical pixel inputs of the pixel data 360 reaches or exceeds a threshold number, and may output a "0" or low logic value when the count of consecutive identical pixel inputs 360 is below the threshold number. The threshold number may correspond to, or may be equal to, the pipeline depth (memory) N of the display logic 330.

The display logic bypass system 335 may also include a multiplexer 380. The multiplexer 380 may be connected to the counter 340. The multiplexer 380 may be configured to receive the counter output 345 from the counter 340.

The multiplexer 380 may also be configured to receive a display logic pixel value output 350 from the display logic 330, and to receive a previously output pixel value 350b, as will be described below.

The display logic bypass system 335 may also include a previously output pixel value register 385. The previously output pixel value register 385 may be connected to the multiplexer 380. The previously output pixel value register 385 may be configured to receive a currently output pixel value 350a from the multiplexer 380. The previously output pixel value register 385 may be configured to output the previously output pixel value 350b to the multiplexer 380. The previously output pixel value register 385 may also be configured to output the previously output pixel value 350b to a driver (e.g., the driver 270 of FIG. 2). Accordingly, the driver may use the previously output pixel value 350b to determine how to drive a display panel connected thereto (e.g., the display panel 220 of FIG. 2).

The currently output pixel value 350a may correspond to the display logic pixel value output 350 that is received by the multiplexer 380 from the display logic 330, or may correspond to the previously output pixel value 350b, as will be discussed further below.

The display logic bypass system 335 may further include a clock-gating cell 370. The clock-gating cell 370 may be connected to the counter 340, and may also be connected to the display logic 330. The clock-gating cell 370 may be a logic block designed for clock gating. Accordingly, the clock-gating cell 370 may gate a clock without inducing glitches on the output clock. Accordingly, the inputs to the clock-gating cell 370 are not limited to the polarities described herein, so long as the inputs are understood by the logic of the clock-gating cell 370.

The clock-gating cell 370 may be configured to receive a clock signal (e.g., an externally supplied clock signal Clk) 390. The clock-gating cell 370 may be configured to selectively output the clock signal 390 as the clock-gating cell output 375 to the display logic 330. That is, the clock-gating cell 370 may selectively pass though the received clock signal 390 to the display logic 330 to enable operation of the display logic 330.

The clock-gating cell 370 may also be configured to receive the counter output 345 from the counter 340. The clock-gating cell 370 may be configured to pass the clock signal 390 through as the clock-gating cell output 375 to the display logic 330 when the counter output 345 is 0 (e.g., when the tally of consecutive pixels corresponding to identical data is below the threshold number). The clock-gating cell 370 may be configured to prevent the clock signal 390 from reaching the display logic 330 when the counter output 345 is 1 (e.g., when the count is at or above the threshold).

Accordingly, the display logic 330 may power down, and may produce no new display logic pixel value output 350 while powered down, when the display logic 330 receives no clock signal 390 due to receiving no clock-gating cell output 375 from the clock-gating cell 370.

As described above, the multiplexer 380 may be configured to receive the previously output pixel value 350b from the previously output pixel value register 385. The multiplexer 380 may be configured to hold and output the previously output pixel value 350b as the currently output pixel value 350a when the counter output 345 is 1 (e.g., when the count is at or above the threshold number indicating that the number of consecutive pixels having identical pixel data exceeds the pipeline depth of the display logic 330). Contrastingly, the multiplexer 380 may be configured to output the display logic pixel value output 350 as the currently output pixel value 350a when the counter output 345 is 0 (e.g., when the tally held by the counter 340 is below the threshold number).

Accordingly, the display logic bypass system 335 may use a previous pixel value input register 310, a comparator 320, and a counter 340 to compare the last N input 360 (pixels) to the display logic 330. When the count held by the counter 340 is larger than the pipeline depth (memory) of N of the display logic 330 (e.g., when the threshold number is reached or exceeded), the counter 340 may direct the clock-gating cell 370 to withhold the clock signal 390 from the display logic 330 to cause the display logic 330 to power down, and may direct the multiplexer 380 to hold the previously output pixel value 350b that was previous output from the display logic 330 as the display logic pixel value output 350. The multiplexer 380 may then send the previously output pixel value 350b, which is held by the previously output pixel value register 385, as the currently output pixel value 350a (as the display logic 330 may be powered down, and no display logic pixel value output 350 will be received from the display logic 330).

That is, if all of the last N input pixel values of the pixel data 360 are the same (as determined by the comparator 320 and the counter 340), the display logic bypass system 335 may then gate the clock signal 390 using the clock-gating cell 370, may hold the display logic pixel value output 350 at the multiplexer 380, and may continue to output the held display logic pixel value output 350 (e.g., to the driver 270 of FIG. 2). The display logic bypass system 335 may thereafter restart delivery of the clock signal 390 as the clock-gating cell output 375 to the display logic 330 as soon as the current pixel input value 360a of the pixel data 360 does not match the last set of previous pixel input value 360b.

Figure 4:
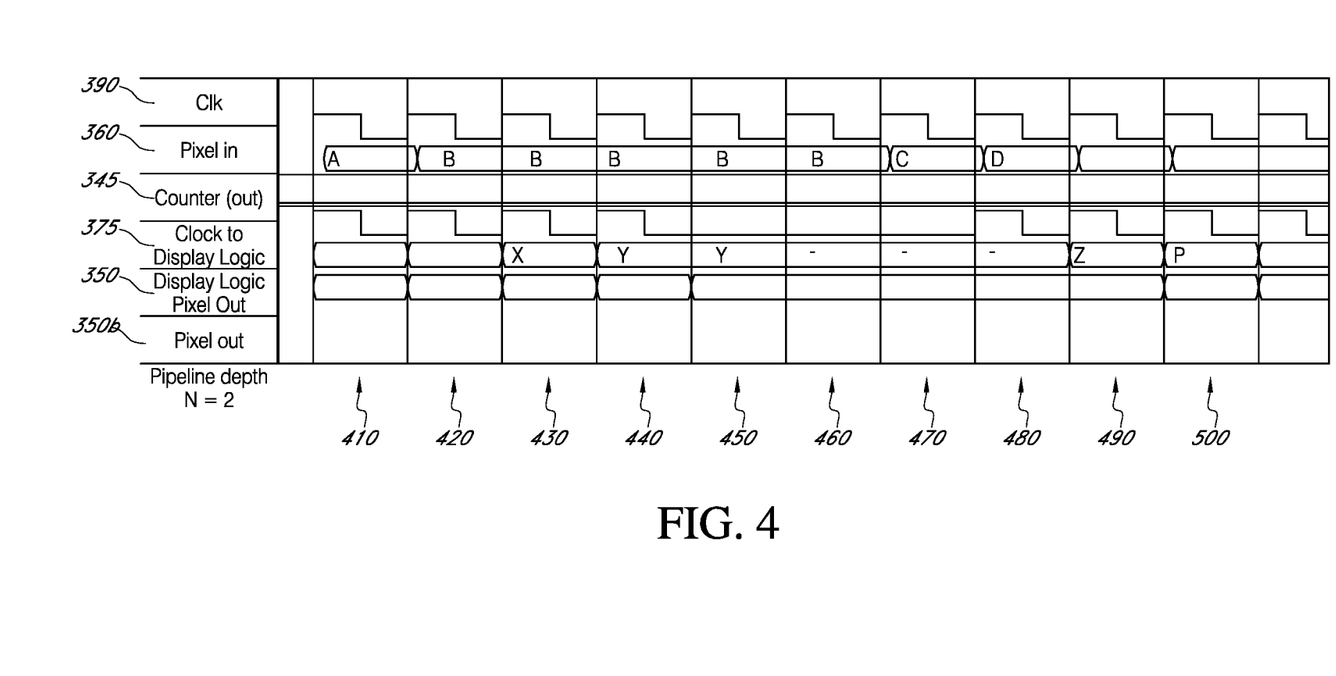
FIG. 4 illustrates a timing diagram depicting signals occurring in the display logic bypass of the embodiment of FIG. 3, according to an embodiment of the present disclosure.

FIG. 4 illustrates a timing diagram depicting signals occurring in the display logic bypass system 330 of the embodiment of FIG. 3, according to an embodiment of the present disclosure.

Referring to FIG. 4, FIG. depicts ten clock cycles corresponding to the clock signal 390. In the present example, for simplicity of explanation, it will be assumed that the pipeline depth N (memory) of the display logic 330 is 2, although the pipeline depth N in other embodiments may be significantly larger.

During a first clock cycle 410, the value of the input pixel 360 may be represented by the value "A," in this case the pixel is "ef_eff0." In the present example, the input pixel 360 is a first input pixel 360. Accordingly, the comparator 320 may determine that there is no match between the current pixel input value 360a and the previous pixel input value 360b (e.g., there may be a lack of any previous pixel input value 360b to use for a comparison). The comparator 320 may, therefore, output a "0" as the comparator output 325 to the counter 340 to reset the tally of the counter 340.

Because the tally of the counter 340 does not exceed the pipeline depth N of 2, the counter 340 may output a "0" as the counter output 345. Accordingly, the clock-gating cell 370 may pass though the clock signal 390 as its clock-gating cell output 375 to the display logic 330. Accordingly, the display logic 330 may maintain a power on state.

Further, the display logic 330 may output a display logic pixel value output 350 having a value "X" as a function of the pixel in 360 value of "A" two cycles later, at 430, due to the pipeline depth of 2. Accordingly, the multiplexer 380 may receive the value "X" from the display logic 330 and a value "0" from the counter 340, and may therefore pass through the value "X" from the display logic 330 to output a multiplexer out 350a having a value of "X," which is thereafter passed through the previously output pixel value register 385 as the output pixel value 350b at time 440 due to one-cycle delay. It should be noted that, although the one-cycle delay is shown in this implementation of the design, it is not necessary.

During a second clock cycle 420, the value of the input pixel 360 may be represented by a different value "B." Because the previous pixel input value 360b held by the previous pixel value input register 310 is the value "A" from the first clock cycle 410, the comparator 320 may determine that there is no match between the current pixel input value 360a and the previous pixel input value 360b. The comparator 320 may, therefore, output a "0" as the comparator output 325 to the counter 340 to reset the tally of the counter 340.

Because the tally of the counter 340 does not exceed the pipeline depth N of 2, the counter 340 may again output a "0" as the counter output 345, and the clock-gating cell 370 may again pass though the clock signal 390 as its clock-gating cell output 375 to the display logic 330 such that the display logic 330 may maintain a power on state.

Further, the display logic 330 may output a display logic pixel value output 350 having a value "Y" as a function of the pixel in 360 value of "B," again 2 cycles later at time 440. Accordingly, the multiplexer 380 may receive the value "Y" from the display logic 330 and a value "0" from the counter 340, and may therefore pass through the value "Y" from the display logic 330 to output a multiplexer out 350a having a value of "Y," which is thereafter passed through the previously output pixel value register 385 as the output pixel value 350b one cycle later at 450.

During a third clock cycle 430, the value of the input pixel 360 may again be represented by the value "B." Because the previous pixel input value 360b held by the previous pixel value input register 310 is the value "B" from the second clock cycle 420, the comparator 320 may determine that there is a match between the current pixel input value 360a and the previous pixel input value 360b. The comparator 320 may, therefore, output a "1" as the comparator output 325 to the counter 340 to cause the counter 340 to increment the tally of the counter 340 to indicate two consecutive identical values received as the current pixel input value 360a.

Because the tally of the counter 340 is 1, which does not exceed the pipeline depth N of 2, the counter 340 may again output a "0" as the counter output 345, and the clock-gating cell 370 may again pass though the clock signal 390 as its clock-gating cell output 375 to the display logic 330 such that the display logic 330 may maintain a power on state.

Further, the display logic 330 may again output a display logic pixel value output 350 having a value "Y" as a function of the pixel in 360 value of "B," at time 450 the multiplexer 380 may receive the value "Y" from the display logic 330 and a value "0" from the counter 340, and may pass through the value "Y" from the display logic 330 to output a multiplexer out 350a having a value of "Y," which is thereafter passed through the previously output pixel value register 385 as the output pixel value 350b at time 460.

During a fourth clock cycle 440, the value of the input pixel 360 may be represented by the value "B" for a third consecutive time. Because the previous pixel input value 360b held by the previous pixel value input register 310 is the value "B" from the third clock cycle 430, the comparator 320 may determine that there is a match between the current pixel input value 360a and the previous pixel input value 360b, and the comparator 320 may again output a "1" as the comparator output 325 to the counter 340 to cause the counter 340 to increment the tally of the counter 340, thereby incrementing the tally to indicate that 3 consecutive identical values have been received as the current pixel input value 360a.

Because the tally of the counter 340 indicates that the number of consecutive identical pixel values received as the current pixel input value 360a exceeds the pipeline depth N of 2, the counter 340 may output a "1" as the counter output 345. Accordingly, the clock-gating cell 370 may block the clock signal 390 from being delivered to the display logic 330 such that the display logic 330 may be powered off. Therefore, the display logic 330 may not output any display logic pixel value output 350 at time 460. Further, although the multiplexer 380 may not receive any value from the display logic 330, the multiplexer 380 receives the value "1" from the counter 340, and also receives the previously output pixel value 350b having the value "Y" from the previously output pixel value register 385. Accordingly, the multiplexer 380 may output the currently output pixel value 350a to the previously output pixel value register 385, which passes the value "Y" as the output pixel value 350b on a following clock signal at time 470.

During a fifth clock cycle 450, the value of the input pixel 360 may be represented by the value "B" for a fourth consecutive time. Because the previous pixel input value 360b held by the previous pixel value input register 310 is the value "B" from the fourth clock cycle 440, the comparator 320 may determine that there is a match between the current pixel input value 360a and the previous pixel input value 360b, and may again output a "1" as the comparator output 325 to the counter 340 to cause the counter 340 to increment the tally of the counter 340.

Because the tally of the counter 340 still exceeds the pipeline depth N of 2, the counter 340 may again output a "1" as the counter output 345, the clock-gating cell 370 may again block the clock signal 390 from being delivered to the display logic 330 such that the display logic 330 may remain powered off and may not output any display logic pixel value output 350 at time 470. Also, the multiplexer 380 may again not receive any value from the display logic 330, may receive the value "1" from the counter 340, may receive the previously output pixel value 350b having the value "Y" from the previously output pixel value register 385, and may again output the display logic pixel value output 350a as a pixel value to the previously output pixel value register 385 such that the value "Y" is output as the output pixel value 350b at time 480.

During a sixth clock cycle 450, the value of the input pixel 360 may be represented by the value "B" for a fifth consecutive time. Because the previous pixel input value 360b held by the previous pixel value input register 310 is the value "B" from the fourth clock cycle 440, the comparator 320 may determine that there is a match between the current pixel input value 360a and the previous pixel input value 360b, and may again output a "1" as the comparator output 325 to the counter 340 to cause the counter 340 to increment the tally of the counter 340.

Because the tally of the counter 340 still exceeds the pipeline depth N of 2, the counter 340 may again output a "1" as the counter output 345, the clock-gating cell 370 may again block the clock signal 390 from being delivered to the display logic 330 such that the display logic 330 may remain powered off and may not output any display logic pixel value output 350 at time 480. Also, the multiplexer 380 may again not receive any value from the display logic 330, may receive the value "1" from the counter 340, may receive the previously output pixel value 350b having the value "Y" from the previously output pixel value register 385, and may again output the display logic pixel value output 350a as a pixel value to the previously output pixel value register 385 such that the value "Y" is output as the output pixel value 350b at 490.

During a seventh clock cycle 470, the value of the input pixel 360 may be represented by the value "C." Because the previous pixel input value 360b held by the previous pixel value input register 310 is the value "B" from the fifth clock cycle 450, the comparator 320 may determine that there is no match between the current pixel input value 360a and the previous pixel input value 360b, and may output a "0" as the comparator output 325 to the counter 340 to cause the counter 340 to reset the tally of the counter 340.

Once the tally of the counter 340 is reset, the number of consecutive identical pixel values received as the current pixel input value 360a is 0, and does not exceed the pipeline depth N of 2. Accordingly, the counter 340 may output a "0" as the counter output 345, and the clock-gating cell 370 may pass though the clock signal 390 as its clock-gating cell output 375 to the display logic 330.

Accordingly, the display logic 330 may transition from a power down state to a power on state, and the display logic 330 may output a display logic pixel value output 350 having a value "Z" as a function of the pixel in 360 value of "C." Accordingly, the multiplexer 380 may receive the value "Z" from the display logic 330 and a value "0" from the counter 340, and may therefore pass through the value "Z" from the display logic 330 to output a multiplexer out 350a at time 490 having a value of "Z," which is thereafter passed through the previously output pixel value register 385 as the output pixel value 350b at time 500.

According to some embodiments, one logic block (e.g., the display logic 330) can be divided into multiple sub-logic blocks, and they each can have their own smart-gate logic. According to some embodiments, the clock-gating criteria may set the last N inputs to be the same. According to some embodiments, the criteria can be generalized such that, if for a sequence of inputs, the output does not change or periodically changes between a finite set of values, when that sequence repeats, hold the output (or switch between the set of values) and gate the clock to the logic block.

Thus embodiments may be utilized for a logic block in which output is strictly a function of the pixel input with finite memory, and may provide a monitoring mechanism that determines whether the last output of the logic block can be used for the next output of the logic block based on the next pixel input to the logic block, and may further provide a clock-gating mechanism that gates to the clock to the logic block and holds the output while the hold condition is met.

According to the above, embodiment of the present disclosure may provide a display device having increased power efficiency by providing a method for decreasing power consumption by a display logic of the display device during processing of low entropy images. Accordingly, the embodiments described herein provide improvements to the field of display technology.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise for example indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A method of reducing power consumption by a display device comprising a display logic for processing pixel data, and a display panel comprising a plurality of pixels, the method comprising:
    receiving the pixel data indicating input values for the plurality of pixels;
    counting a number of consecutive pixels of the plurality of pixels that have consecutive identical input values;
    determining, for a single image frame, that the number of consecutive pixels exceeds a threshold number; and
    powering down the display logic.

2. The method of claim 1, wherein the threshold number corresponds to a pipeline depth of the display logic.

3. The method of claim 1, wherein the powering down the display logic comprises clock-gating the display logic to prevent a clock signal from being output to the display logic.

4. The method of claim 1, further comprising:
    outputting a reset signal from a comparator to a counter to reset a tally of the consecutive pixels held by the counter in response to determining that pixel data corresponding to consecutive pixels indicates different values; and
    passing through a clock signal to the display logic upon resetting the tally to power on the display logic.

5. The method of claim 1, wherein the powering down comprises outputting a counter output indicating that the number of consecutive pixels exceeds the threshold number from a counter.

6. The method of claim 1, further comprising:
    outputting a comparator output from a comparator according to a comparison of a current pixel input value corresponding to the pixel data with an immediately previous pixel input value corresponding to the pixel data; and
    incrementing or resetting a tally of the consecutive pixels held by a counter according to the comparator output.

7. The method of claim 1, further comprising:
    holding a previous pixel output value output from the display logic; and
    outputting the previous pixel output value as a current pixel output value.

8. A display device capable of reduced power consumption, the display device comprising:
    a display panel comprising a plurality of pixels;
    a display logic for receiving pixel data corresponding to indicating input values for the plurality of pixels; and
    a display logic bypass system comprising:
        a comparator and a counter for determining, for a single image frame, that a number of consecutive pixels having consecutive identical input values exceeds a threshold number,
    wherein the display logic bypass system is configured to power down the display logic.

9. The display device of claim 8, wherein the threshold number corresponds to a pipeline depth of the display logic.

10. The display device of claim 8, further comprising a clock-gating cell for powering down the display logic by clock-gating the display logic to prevent a clock signal from being output to the display logic.

11. The display device of claim 10, wherein the comparator is configured to output a reset signal to the counter to reset a tally held by the counter in response to determining that pixel data corresponding to consecutive pixels indicates different values, and
    wherein the counter is configured to output a counter output to the clock-gating cell upon resetting the tally to cause the clock-gating cell to pass through a clock signal to the display logic to power on the display logic.

12. The display device of claim 8, wherein the counter is configured to output a counter output indicating that the number of consecutive pixels exceeds the threshold number to power down the display logic.

13. The display device of claim 8, wherein the comparator is configured to output a comparator output according to a comparison of a current pixel input value corresponding to the pixel data with an immediately previous pixel input value corresponding to the pixel data, and
    wherein the counter is configured to increment or reset a tally of the consecutive pixels according to the comparator output.

14. The display device of claim 8, further comprising:
    a multiplexer connected to the display logic; and
    a previously output pixel value register connected to the multiplexer for holding a previous pixel output value output from the display logic,
    wherein the multiplexer is configured to output the previous pixel output value as a current pixel output value.

15. A non-transitory computer readable medium implemented on a display device comprising a display logic for processing pixel data, and a display panel comprising a plurality of pixels, the non-transitory computer readable medium having computer code that, when executed on a processor, implements a method of reducing power consumption, the method comprising:
    receiving the pixel data indicating input values for the plurality of pixels;
    counting a number of consecutive pixels of the plurality of pixels that have consecutive identical input values;
    determining, for a single image frame, that the number of consecutive pixels exceeds a threshold number; and
    powering down the display logic.

16. The non-transitory computer readable medium of claim 15, wherein the powering down the display logic comprises clock-gating the display logic to prevent a clock signal from being output to the display logic.

17. The non-transitory computer readable medium of claim 15, wherein the method further comprises:
- outputting a reset signal from a comparator to a counter to reset a tally of the consecutive pixels held by the counter in response to determining that pixel data corresponding to consecutive pixels indicates different values; and
- passing through a clock signal to the display logic upon resetting the tally to power on the display logic.

18. The non-transitory computer readable medium of claim 15, wherein the powering down comprises outputting a counter output indicating that the number of consecutive pixels exceeds the threshold number from a counter.

19. The non-transitory computer readable medium of claim 15, wherein the method further comprises:
- outputting a comparator output from a comparator according to a comparison of a current pixel input value corresponding to the pixel data with an immediately previous pixel input value corresponding to the pixel data; and
- incrementing or resetting a tally of the consecutive pixels held by a counter according to the comparator output.

20. The non-transitory computer readable medium of claim 15, wherein the method further comprises:
- holding a previous pixel output value output from the display logic; and
- outputting the previous pixel output value as a current pixel output value.

21. A method of reducing power consumption by a display device comprising a display logic for processing pixel data, and a display panel comprising a plurality of pixels, the method comprising:
- receiving the pixel data indicating input values for the plurality of pixels;
- determining, for a single image frame, a number of consecutive pixels of the plurality of pixels having consecutive identical input values, the consecutive pixels being in a common row, exceeds a threshold number; and
- powering down the display logic.

22. The method of claim 21, wherein the threshold number corresponds to a pipeline depth of the display logic.

23. The method of claim 21, wherein the powering down the display logic comprises clock-gating the display logic to prevent a clock signal from being output to the display logic.

24. The method of claim 21, further comprising:
- outputting a reset signal from a comparator to a counter to reset a tally held by the counter in response to determining that pixel data corresponding to consecutive pixels indicates different values; and
- passing through a clock signal to the display logic upon resetting the tally to power on the display logic.

25. The method of claim 21, wherein the powering down comprises outputting a counter output indicating that the number of consecutive pixels exceeds the threshold number from a counter configured to tally the consecutive pixels.

26. The method of claim 21, further comprising:
- outputting a comparator output from a comparator according to a comparison of a current pixel input value corresponding to the pixel data with an immediately previous pixel input value corresponding to the pixel data; and
- incrementing or resetting a tally held by a counter configured to tally the consecutive pixels according to the comparator output.

27. The method of claim 21, further comprising:
- holding a previous pixel output value output from the display logic; and
- outputting the previous pixel output value as a current pixel output value.

28. The method of claim 1, wherein the receiving the pixel data corresponding to the plurality of pixels comprises receiving input serial data and converting the serial data to the pixel data.

* * * * *